Patented Apr. 15, 1947

2,419,048

UNITED STATES PATENT OFFICE 2,419,048

PAINT

Harlan E. Althouse, Belleville, N. J., assignor to L. Sonneborn Sons, Inc., a corporation of Delaware No Drawing. Application June 1, 1944, Serial No. 538,326

2 Claims. (Cl. 106—287)

This invention relates to new and useful improvements in paints. In the past the usefulness of many paints, and particularly their storage life, is often seriously impaired by their acquisition of thixotropic characteristics. One of the main causes of this phenomenon is the presence of water in the paint, introduced either by way of pigment absorbed moisture or in the course of the manufacturing process. A thixotropic condition, as the term is generally understood in the art, connotes that condition of thickening or increase in body of the paint to a point where it ceases to flow and becomes difficult, if not impossible, to brush out to a uniform coating.

Attempts have been made in the past to overcome thixotropy of paints, and particularly to cause a thixotropic paint to revert to normal fluidity. Such attempts include the use of solvents and thinning agents. In certain instances where the thixotropic condition is not caused by water content, but is the result of other factors such as inter-action of reactive pigments with the oil base or the like, some benefit was derived from this practice. Attempts, however, to cure or relieve a thixotropic condition caused by water content have failed when following these practices. At best the solvents or thinners act to give a temporary fluidity by reason of increased solvent content, but they do not overcome the basic problem and seriously impair other characteristics of the paint, such as its covering power, opacity, and wearing and weathering characteristics of the applied paint films.

One object of the invention comprises, inter alia, means of avoiding or eliminating or curing a thixotropic condition of paint, as well as a paint product substantially free from a tendency to become subject to thixotropic changes caused by water content.

Another object of the invention comprises means for reverting a thixotropic paint, the thixotropy of which is caused by water content, to a state of brushable fluidity without interference with, or impairment of, such valuable characteristics of the paint as covering power, film formation, opacity and quality of film produced, etc.

These and still further objects of the invention will be seen from the following description.

In accordance with the invention a relatively small amount of alkali metal petroleum mahogany sulfonate is added to a paint containing water, and normally subject, by reason of such water content, to exhibit thixotropic tendencies. Alternatively, small amounts of the alkali metal petroleum mahogany sulfonate may be added to a paint already thixotropic in character due to water content, to thereby reduce the same to normal fluidity.

Within the practice of my invention I find it of advantage to use from about 0.065 to 0.28 and preferably from about 0.18 to 0.23% of the mahogany petroleum sulfonate (by weight) for every 0.5% of water present (calculated on the total weight of paint). The incorporation of the mahogany petroleum sulfonate is preferably realized in the form of a solution in a suitable solvent. Ordinarily petroleum mahogany sulfonates are commercially obtained containing varying percentages of occluded oil resulting from their method of production. These amounts of occluded oil, variably ranging up to about 35% (by weight) of the sulfonate product need not be removed and, if desired, the commercial product, including the occluded oil, may be used without deleterious effect upon the paint product. Thus, for instance, a 50% solution of a commercial alkali metal, such as sodium petroleum mahogany sulfonate in petroleum spirits (and containing occluded oil) may be used. The amount of such solution to be incorporated in the paint is determined on a dry weight basis of the sulfonate in solution within the requirements above specified.

The paint products obtained in accordance with the invention and comprising a normally thixotropic paint containing incorporated therein a relatively small amount of alkali metal petroleum mahogany sulfonate, are substantially free from thixotropic characteristics as the result of water or moisture content.

The incorporation of petroleum mahogany sulfonate, in accordance with the invention, does not deleteriously affect the paints with respect to either yellowing, washability, or water resistance.

The following examples are furnished by way of illustration and not of limitation:

Example I

A standard egg-shell flat white paint (Federal standard specifications) was made up, using an ester gum linseed oil vehicle and standard white pigments comprising titanium oxide in the form of the commercial pigment known as "Titanox C" and standard whiting as extender. The pigments chosen were ascertained to be bone-dry and the finished paint was found to have a viscosity of 88 units on the Stormer viscosimeter. Addition of 0.2% water by weight to this paint increased the viscosity to a point where it became impossible to measure it on the Stormer instrument.

Example II

The aforedescribed paint was compounded, using the same pigments as in Example I, but having an absorbed moisture content of 0.5%. The viscosity of this paint was too great to be measured by the Stormer instrument. When, however, petroleum sulfonate was added to this paint in the proportion of 1½ pounds (dry oil free basis) per 100 gallons of paint, the paint lost its thixotropy and acquired a measurable viscosity of 88 Stormer units. The fluidity of this paint was still retained after two weeks storage, as indicated by the fact that at the end of this period the viscosity still remained at 88 Stormer units.

Example III

A flat white paint (Federal standard specifications) with an ascertained moisture content of 0.2% by weight of the paint and exhibiting thixotropic state was converted to a state of fluidity by the addition of petroleum sulfonate in the proportion of two pounds (dry oil free basis) per hundred gallons of paint. This addition imparted a Stormer viscosity of 88 units. The water content of this paint was then increased to 0.35% causing an increase in viscosity to 99 units. Further increase of moisture content to 0.5% induced an additional increase in viscosity to 109 Stormer units. When at this point an additional quantity of petroleum sulfonates (1.3 pounds per hundred gallons of paint) was incorporated, the viscosity of the paint reverted to 88 Stormer units.

Example IV

A standard gloss white enamel (Federal standard specifications) was prepared using an ester gum oil vehicle and a standard white pigment comprising titanium oxide. The pigment was ascertained to be bone dry. This enamel possessed a viscosity of 83 Stormer units measured on the Stormer instrument. Upon addition of 1% water, the enamel became very thixotropic having a measured viscosity of approximately 116 units on the Stormer instrument. To this viscous water-containing enamel was then added ¾ of a pound petroleum mahogany sulfonate (dry oil free basis) per hundred gallons of the enamel paint with a resultant drop to 99 units viscosity on the Stormer instrument. Further additions of petroleum mahogany sulfonate within the range of 0.18 to 0.28% of sulfonate for every 0.5% of water resulted in additional lowering of viscosity.

The products obtained in accordance with the invention are substantially permanently non-thixotropic.

Within the scope of my invention I find it, for best results, of advantage to subject the final product after the incorporation of the petroleum mahogany sulfonate to a paint grinding step.

The foregoing specific description is for purposes of illustration and not of limitation, and it is, therefore, my intention that the invention be limited only by the following claims or their equivalents, wherein I have endeavored to claim broadly all inherent novelty.

I claim:

1. A novel paint composition substantially non-thixotropic by reason of water content therein, comprising a water containing oleo-resinous paint normally thixotropic as the result of absorbed water content and from 0.065% to 0.28% of an alkali metal petroleum mahogany sulfonate for every 0.5% of water content calculated on the weight of the total paint composition.

2. A novel paint composition in accordance with claim 1 in which said alkali metal petroleum mahogany sulfonate is present in amount of from 0.18 to 0.28% for every 0.5% of water content calculated on the weight of the total paint composition.

HARLAN E. ALTHOUSE.

REFERENCES CITED

The following references are of record in the file of this patent:

UNITED STATES PATENTS

| Number | Name | Date |
|---|---|---|
| 2,341,994 | Kingsbury et al. | Feb. 15, 1944 |
| 1,906,962 | Heckel | May 2, 1933 |

OTHER REFERENCES

"Protective and Decorative Coatings," Mattiello, John Wiley and Sons, New York, vol. IV, page 133. (Copy in Div. 64.)

"Surface Active Agents in Printing Ink"—Fischer, American Ink Maker, April 1943, pages 21–22. (Copy in Scientific Library.)

"The Expanding Applications of Wetting Agents," Lenker, Chemical Industries, vol. 48, No. 3, March 1941, pages 324–325. (Copy in Division 64.)